United States Patent
Aoki et al.

(10) Patent No.: US 12,151,714 B2
(45) Date of Patent: Nov. 26, 2024

(54) VEHICLE CONTROL SYSTEM AND VEHICLE CONTROL METHOD

(71) Applicant: Hitachi Astemo, Ltd., Hitachinaka (JP)

(72) Inventors: Naoto Aoki, Ibaraki (JP); Shigenori Hayase, Tokyo (JP); Akira Kuriyama, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 315 days.

(21) Appl. No.: 17/595,281

(22) PCT Filed: May 15, 2020

(86) PCT No.: PCT/JP2020/019404
§ 371 (c)(1),
(2) Date: Nov. 12, 2021

(87) PCT Pub. No.: WO2020/235467
PCT Pub. Date: Nov. 26, 2020

(65) Prior Publication Data
US 2022/0227395 A1 Jul. 21, 2022

(30) Foreign Application Priority Data
May 23, 2019 (JP) .................................. 2019-096643

(51) Int. Cl.
*B60W 60/00* (2020.01)
*B60W 40/10* (2012.01)
*B60W 40/105* (2012.01)

(52) U.S. Cl.
CPC ...... *B60W 60/0027* (2020.02); *B60W 40/105* (2013.01); *B60W 2520/14* (2013.01); *B60W 2554/4041* (2020.02); *B60W 2554/80* (2020.02)

(58) Field of Classification Search
CPC .......... B60W 60/0027; B60W 40/105; B60W 2520/14; B60W 2554/4041;
(Continued)

(56) References Cited

U.S. PATENT DOCUMENTS 10,102,761 B2 * 10/2018 Takabayashi .......... G08G 1/166
2009/0080701 A1 3/2009 Meuter et al.
(Continued)

FOREIGN PATENT DOCUMENTS

EP 2 043 045 A1 4/2009
EP 3 415 943 A1 12/2018
(Continued)

OTHER PUBLICATIONS

International Search Report (PCT/ISA/210) issued in PCT Application No. PCT/JP2020/019404 dated Sep. 15, 2020 with English translation (five (5) pages).
(Continued)

*Primary Examiner* — Rodney A Butler
(74) *Attorney, Agent, or Firm* — Crowell & Moring LLP

(57) ABSTRACT

A vehicle control system includes an integration unit that estimates information on a position and a speed of a target existing in an external field and errors of the position and the speed of the target, based on information from a movement sensor that acquires movement information including a vehicle speed and a yaw rate of an own vehicle, and information from an external field sensor that acquires information on the external field of the own vehicle. The integration unit uses not the information from the external field sensor, but the vehicle speed and the yaw rate acquired by the movement sensor, to predict a position and a speed of the target and errors of the position and the speed of the (Continued)

target at a second time after a first time, from a position and a speed of the target and errors of the position and the speed at the first time.

12 Claims, 4 Drawing Sheets

(58) Field of Classification Search
CPC ......... B60W 2554/80; B60W 2520/10; B60W 2554/802; B60W 2554/804; B60W 40/04; G01S 13/931; G01S 15/93; G01S 17/93; G08G 1/01
See application file for complete search history.

(56) References Cited

U.S. PATENT DOCUMENTS

2018/0022472 A1* 1/2018 Chevalley .............. H04N 23/58
701/3

| | | | |
|---|---|---|---|
| 2019/0079181 | A1 | 3/2019 | Mizuno et al. |
| 2020/0031341 | A1 | 1/2020 | Kitamura et al. |
| 2021/0302534 | A1 | 9/2021 | Kellner et al. |

FOREIGN PATENT DOCUMENTS

| | | |
|---|---|---|
| JP | 2009-139320 A | 6/2009 |
| JP | 2017-91029 A | 5/2017 |
| JP | 2018-55451 A | 4/2018 |
| JP | 2019-52920 A | 4/2019 |

OTHER PUBLICATIONS

Japanese-language Written Opinion (PCT/ISA/237) issued in PCT Application No. PCT/JP2020/019404 dated Sep. 15, 2020 (four (4) pages).
German-language Office Action issued in German Application No. 11 2020 002 138.6 dated Apr. 29, 2024 with English translation (10 pages).

* cited by examiner

VEHICLE CONTROL SYSTEM AND VEHICLE CONTROL METHOD

TECHNICAL FIELD

The present invention relates to a vehicle control system that estimates a state of an object by using information on the object detected by different types of sensors.

BACKGROUND ART

Background art of the present technical field includes the following prior art. PTL 1 (JP 2017-91029 A) discloses an object detection device as follows. A relative position/speed calculation unit calculates a relative position and a relative speed of a target object based on a signal from a radio wave transmission and reception unit. A prediction unit predicts the relative position and the relative speed on a track of the target object, which has been previously calculated, from this track by using outputs of an acceleration sensor and a yaw rate sensor. A correlation unit determines whether or not the predicted relative position and relative speed are correlated with the relative position and the relative speed of the target object, which are calculated this time. When the predicted relative position and relative speed are correlated with the calculated relative position and the relative speed, the track is updated by the relative position and the relative speed of the target object, which are calculated this time. When the predicted relative position and relative speed are not correlated with the calculated relative position and the relative speed, a track update unit stores the relative position and the relative speed of the target object, which are calculated this time, in a track storage unit (see Abstract).

CITATION LIST

Patent Literature

PTL 1: JP 2017-91029 A

SUMMARY OF INVENTION

Technical Problem

In the technique disclosed in PTL 1, the track is updated in accordance with whether or not the relative position/relative speed of the target object have a correlation, but it is not assumed that the sensor is undetected during turning of the own vehicle. In this case, if the relative position of the target is estimated by interpolation, there is a possibility that the relative position is estimated to be a wrong position.

Solution to Problem

A representative example of the invention disclosed in this application is as follows. That is, a vehicle control system includes an integration unit that estimates information on a position and a speed of a target existing in an external field and errors of the position and the speed of the target, based on information from a movement sensor that acquires movement information including a vehicle speed and a yaw rate of an own vehicle, and information from an external field sensor that acquires information on the external field of the own vehicle. The integration unit uses not the information from the external field sensor, but the vehicle speed and the yaw rate acquired by the own vehicle movement sensor, to predict a position and a speed of the target and errors of the position and the speed of the target at a second time after a first time, from a position and a speed of the target and errors of the position and the speed at the first time.

Advantageous Effects of Invention

According to one aspect of the present invention, it is possible to improve accuracy of the position and the speed of a target and errors of the position and the speed. Objects, configurations, and effects other than those described above will be clarified by the descriptions of the following embodiments.

DESCRIPTION OF EMBODIMENTS

An embodiment will be described below with reference to the drawings.

Figure 1:
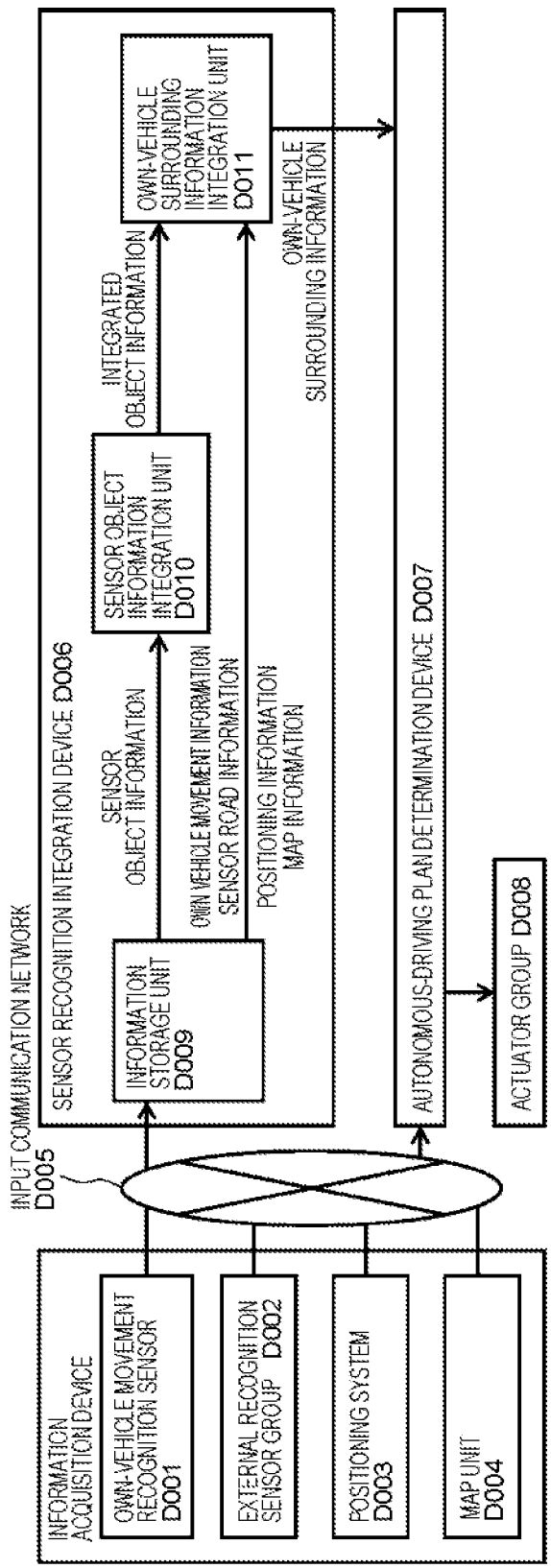
FIG. 1 is a configuration diagram illustrating a vehicle control system according to an embodiment of the present invention.

FIG. 1 is a configuration diagram illustrating a vehicle control system according to an embodiment of the present invention.

The vehicle control system in the present embodiment includes an own-vehicle movement recognition sensor D001, an external-field recognition sensor group D002, a positioning system D003, a map unit D004, an input communication network D005, a sensor recognition integration device D006, an autonomous-driving plan determination device D007, and an actuator group D008. The own-vehicle movement recognition sensor D001 includes a gyro sensor, a wheel speed sensor, a steering angle sensor, an acceleration sensor, and the like mounted on the vehicle, and measures a yaw rate, a wheel speed, a steering angle, an acceleration, and the like representing the movement of the own vehicle. The external-field recognition sensor group D002 detects a vehicle, a person, a white line of a road, a sign, and the like outside the own vehicle, and recognize information on the vehicle, the person, the white line, the sign, or the like. A position, a speed, and an object type of an object such as a vehicle or a person are recognized. The shape of the white line of the road including the position is recognized. For the expression, the position and the content of a sign are recognized. As the external-field recognition sensor group D002, sensors such as a radar, a camera, and a sonar are used. The configuration and number of sensors are not particularly limited. The positioning system D003 measures the position of the own vehicle. As an example of the positioning system D003, there is a satellite positioning system. The map unit D004 selects and outputs map information around the own vehicle. The input communication network D005 acquires information from various information acquisition devices, and transmits the information to the sensor recognition integration device D006. As the input communication network D005, the controller area network (CAN), Ethernet, wireless communication, and the like are used. The CAN is a network generally used in an in-vehicle system. The sensor recognition integration device D006 acquires own vehicle movement information, sensor object information, sensor road information, positioning information, and map information from the input communication network D005. Then, the sensor recognition integration device D006 integrates the pieces of information as own vehicle surrounding information, and outputs the own vehicle surrounding information to the autonomous-driving plan determination device D007. The autonomous-driving plan determination device D007 receives the information from the input communication network D005 and the own-vehicle surrounding information from the sensor recognition integration device D006. The autonomous-driving plan determination device plans and determines how to move the own vehicle, and outputs command information to the actuator group D008. The actuator group D008 operates the actuators in accordance with the command information.

The sensor recognition integration device D006 in the present embodiment includes an information storage unit D009, a sensor object information integration unit D010, and an own-vehicle surrounding information integration unit D011. The information storage unit D009 stores information (for example, sensor data measured by the external-field recognition sensor group D002) from the input communication network D005 and provides the information for the sensor object information integration unit D010 and the own-vehicle surrounding information integration unit D011. The sensor object information integration unit D010 acquires the sensor object information from the information storage unit D009 and integrates the information of the same object, which is detected by a plurality of sensors, as the same information. Then, the sensor object information integration unit outputs the integration result to the own-vehicle surrounding information integration unit D011, as integration object information. The own-vehicle surrounding information integration unit D011 acquires the integration object information, and the own vehicle movement information, the sensor road information, the positioning information, and the map information from the information storage unit D009. Then, the own-vehicle surrounding information integration unit D011 integrates the acquired information as own-vehicle surrounding information, and outputs the own-vehicle surrounding information to the autonomous-driving plan determination device D007.

The sensor recognition integration device D006 is configured by a computer (microcomputer) including an arithmetic operation device, a memory, and an input/output device.

The arithmetic operation device includes a processor and executes a program stored in the memory. A portion of the processing performed by the arithmetic operation device executing the program may be executed by another arithmetic operation device (for example, hardware such as a field programmable gate array (FPGA) and an application specific integrated circuit (ASIC)).

The memory includes a ROM and a RAM which are non-volatile storage elements. The ROM stores an invariable program (for example, BIOS) and the like. The RAM includes a high-speed and volatile storage element such as a dynamic random access memory (DRAM) and a non-volatile storage element such as a static random access memory (SRAM). The RAM stores a program executed by the arithmetic operation device and data used when the program is executed. The program executed by the arithmetic operation device is stored in a non-volatile storage element being a non-transitory storage medium of the sensor recognition integration device D006.

The input/output device is an interface that transmits processing contents by the sensor recognition integration device D006 to the outside or receives data from the outside, in accordance with a predetermined protocol.

Figure 2:
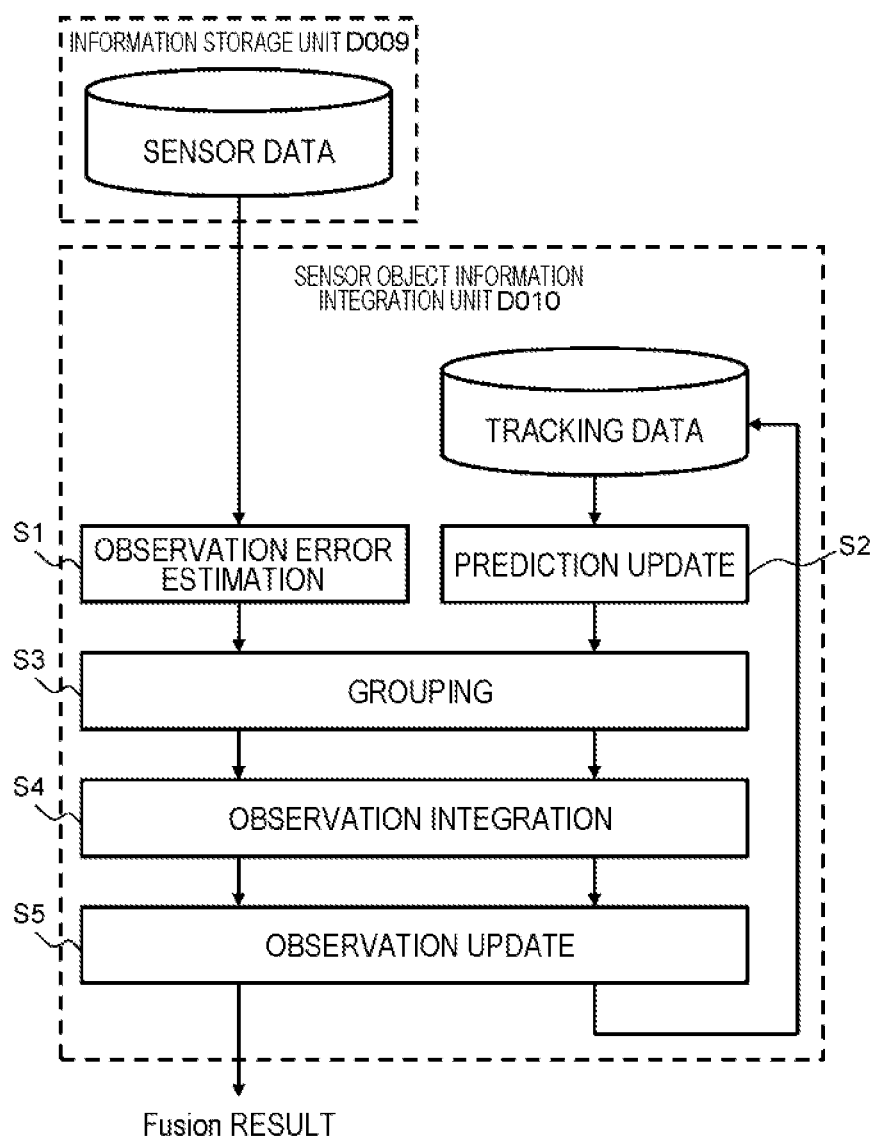
FIG. 2 is a flowchart illustrating an entirety of integration processing in the present embodiment.

FIG. 2 is a flowchart illustrating an entirety of integration processing in the present embodiment.

The information storage unit D009 stores sensor data. The sensor data is information of an object (target) recognized by various sensors (radar, camera, sonar, and the like) of the external-field recognition sensor group D002, and includes data of a relative position, a relative speed, and a relative position/speed of the recognized object in addition to data of a distance and a direction to the object. The relative position/speed can be represented by a range (for example, a Gaussian distribution type error ellipse) in which the object exists at a predetermined probability at a predetermined time. The Gaussian distribution type error ellipse can be represented by a covariance matrix shown in the following expression, and may be represented in another format. For example, as another form, the existence range of the object may be represented by general distribution other than the Gaussian distribution, which is estimated using the particle filter.

The covariance matrix shown in the following expression includes an element indicating a correlation between positions, an element indicating a correlation between speeds, and an element indicating a correlation between positions and speeds.

[Math. 1]

$$P = \begin{pmatrix} P_{x_x x_x} & P_{x_x x_y} & P_{xv_x} & P_{xv_y} \\ P_{x_y x_x} & P_{x_y x_y} & P_{yv_x} & P_{yv_y} \\ P_{v_x x} & P_{v_x y} & P_{v_x v_x} & P_{v_x v_y} \\ P_{v_y x} & P_{v_y y} & P_{v_y v_x} & P_{v_y v_y} \end{pmatrix}$$

Elements indicating correlation between positions (top-left); Elements indicating correlation between speeds (bottom-right).

The memory of the sensor object information integration unit D010 stores tracking data indicating a trajectory of an object recognized by the various sensors of the external-field recognition sensor group D002.

In the integration processing, first, the sensor object information integration unit D010 estimates an error of sensor data (S1). This error is determined by the type of sensor, the position of an object recognized within a recognition range (for example, if the distance to the object is long, the error is large, and the object recognized at the center of the recognition range has a small error), and an external environment (brightness of the external field, visibility, rainfall, snowfall, temperature, and the like).

The sensor object information integration unit D010 updates prediction data of the tracking data (S2). For example, assuming that the object represented by the tracking data performs a uniform linear motion from the previously recognized point without changing the moving direction and the speed, the position of the object at the next time is predicted, and the tracking data is updated.

Then, the sensor object information integration unit D010 executes a grouping process of integrating data representing one object among the predicted position using the tracking data and the observed position using the sensor data (S3). For example, an overlap between the error range of the predicted position using the tracking data and the error range of the observed position using the sensor data is determined, and the predicted position and the observed position where the error ranges overlap each other are grouped as data representing the same object.

Then, the sensor object information integration unit D010 integrates the observation results by using the data determined as the group representing the same object (S4). For example, a weighted average of the predicted positions and the observed positions grouped as the data representing the same object is calculated in consideration of errors of the predicted positions and the observed positions, and an integrated position of the object is calculated.

Then, the integrated position is output as a fusion result, and the tracking data is further updated (S5).

Figure 3:
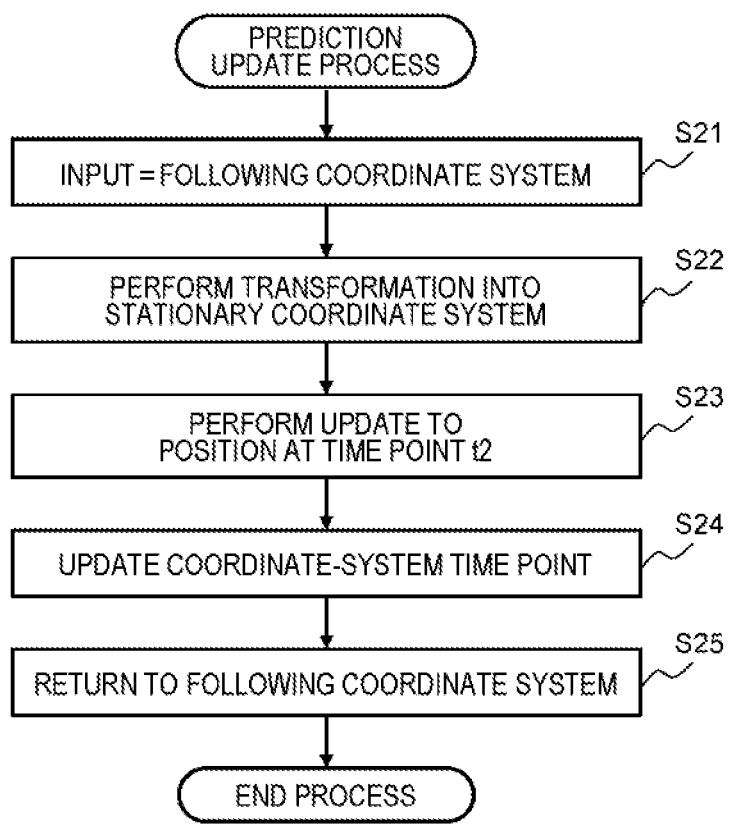
FIG. 3 is a flowchart of a prediction update process in Step S2.
Figure 4:
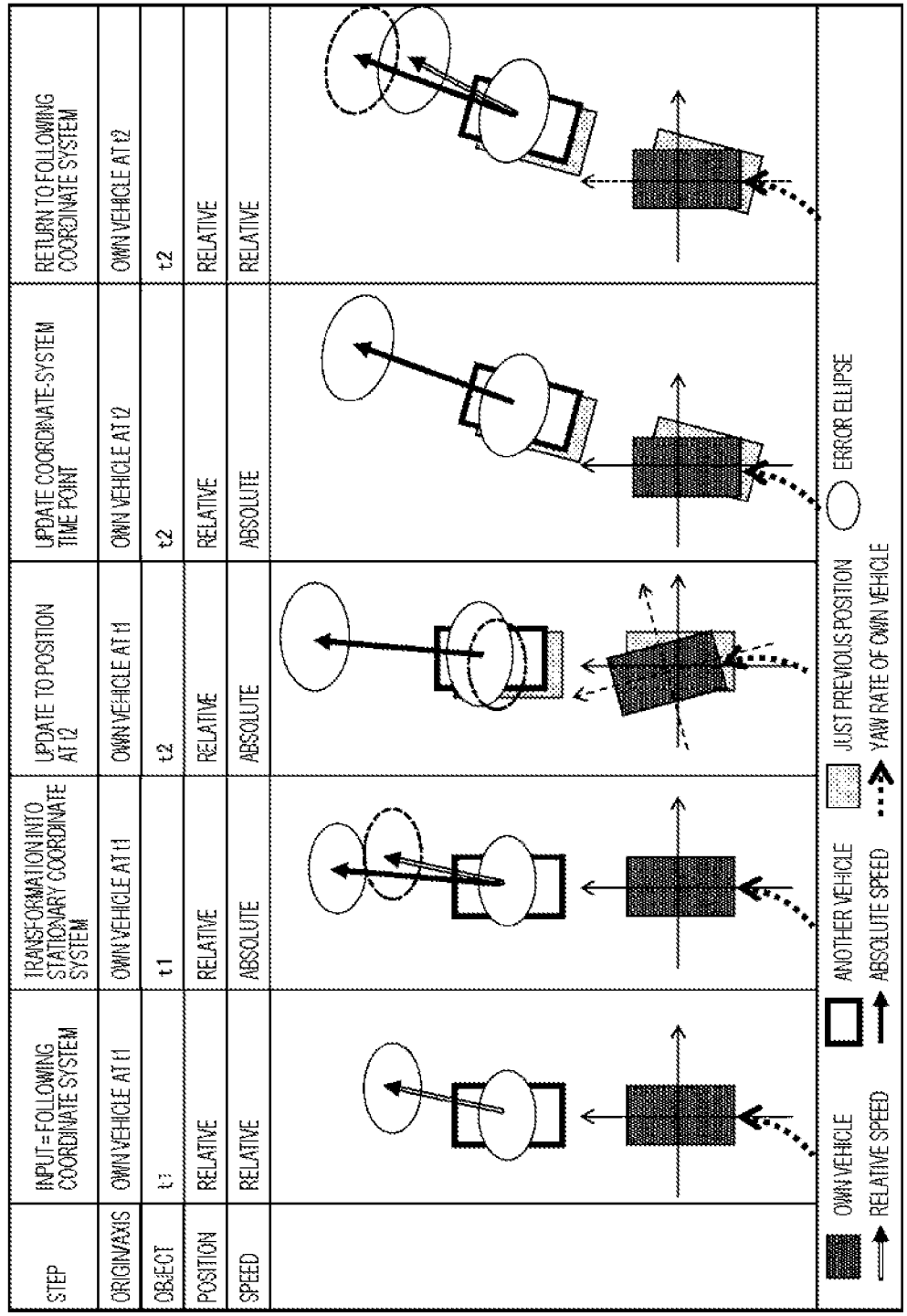
FIG. 4 is a diagram illustrating a process in each step.

FIG. 3 is a flowchart of the prediction update process in Step S2 of FIG. 2. FIG. 4 is a diagram illustrating a process in each step. In FIG. 4, the speed is represented by an arrow, the position is represented by a position on FIG. 4, and the position/relative speed is represented by an error ellipse.

First, the sensor object information integration unit D010 acquires a first relative speed $Vr\_t1\_t1$, a first relative position $X\_t1\_t1$, and a first relative position/relative speed $Pr\_t1\_t1$ of an object around a vehicle at a predetermined time t1 (S21). The relative speed, the relative position, and the relative position/relative speed are generally represented in a following coordinate system (also referred to as a relative coordinate system) based on a vehicle center position of the own vehicle, but may be represented in a coordinate system based on the position of the sensor that has measured the sensor data.

Then, the sensor object information integration unit D010 converts the relative speed data in the following coordinate system into absolute speed data in a stationary coordinate system. For example, the sensor object information integration unit D010 uses the first relative position $X\_t1\_t1$ to convert the acquired first relative speed $Vr\_t1\_t1$ and first relative position/relative speed $Pr\_t1\_t1$ in the following coordinate system into a first absolute speed $Va\_t1\_t1$ and a first relative position/absolute speed $Pa\_t1\_t1$ in the stationary coordinate system (S22).

Then, the sensor object information integration unit D010 obtains the position at time t2 from the position at time t1. For example, with the position $O\_t1\_t1$ of the vehicle as the origin, the sensor object information integration unit D010 converts the first absolute speed $Va\_t1\_t1$, the first relative position $X\_t1\_t1$, and the first relative position/absolute speed $Pa\_t1\_t1$ at the time t1 into the second absolute speed $Va\_t2\_t1$, the second relative position $X\_t2\_t1$, and the second relative position/absolute speed $Pa\_t2\_t1$ at the time t2 (S23).

Then, the sensor object information integration unit D010 updates the origin position of the coordinate system from the time t1 to the time t2, that is, from the coordinate system at the time t1 to the coordinate system at the time t2. For example, the sensor object information integration unit D010 updates the second relative position $X\_t2\_t1$, the second absolute speed $Va\_t2\_t1$, and the second relative position/absolute speed $Pa\_t2\_t1$ of the object with the position $O\_t1\_t1$ of the vehicle at the time t1 as the origin, to the second relative position $X\_t2\_t2$, the second absolute speed $Va\_t2\_t2$, and the second relative position/absolute speed $Pa\_t2\_t2$ of the object with the position $O\_t2\_t1$ of the vehicle at the time t2 as the origin (S24).

In the conversion from the origin position $O\_t1\_t1$ at the time t1 to the origin position $O\_t2\_t1$ at the time t2, the measurement values (that is, the turning operation) of the vehicle speed and the yaw rate of the own vehicle are used.

Since the measured values of the vehicle speed and the yaw rate include errors, the error range indicated by the second relative position/absolute speed $Pa\_t2\_t2$ may be increased in consideration of the error of the vehicle speed and the error of the yaw rate.

Then, the sensor object information integration unit D010 converts the absolute speed data in the stationary coordinate system into relative speed data in the following coordinate system. For example, the sensor object information integration unit D010 uses the second relative position $X\_t2\_2$ to convert the second absolute speed $Va\_t2\_2$ and the second relative position/absolute speed $Pa\_t2\_2$ in the stationary coordinate system into the second relative speed $Vr\_t2\_2$ and the second relative position/relative speed $Pr\_t2\_2$ in the following coordinate system in the updated coordinate system (S25).

As described above, according to the embodiment of the present invention, the relative position of the object at the time t1 is converted into the relative position of the object at the time t2 in a state where the relative speed of the object is converted into the absolute speed while the position information remains as the relative position. Then, the absolute speed of the object is converted into the relative speed. That is, since the relative position in the following coordinate system at the time t2 is converted from the relative position in the following coordinate system at the time t1 in the state of being converted into the absolute speed, it is possible to improve the accuracy of the position and the speed of the target and the errors thereof without using the information from the external-field recognition sensor group D002. In particular, since the turning operation of the own vehicle, which is calculated from the measurement result of the yaw rate is added to the calculation result, it is possible to accurately calculate the relative position/relative speed (error range) even when the own vehicle is turning. Therefore, it is possible to improve the grouping performance of the sensor data of the target and to improve the determination performance of an operation plan.

In addition, since the position and the speed and the errors thereof at the second time are predicted in consideration of the error of the vehicle speed and the error of the yaw rate of the own vehicle, it is possible to more accurately calculate the relative position/relative speed (error range).

In addition, since the error is represented by a covariance matrix according to the Gaussian distribution, it is possible to calculate the relative position/relative speed (error range).

The present invention is not limited to the above-described embodiment, and includes various modifications and equivalent configurations within the spirit of the appended claims. For example, the above examples are described in detail in order to explain the present invention in an easy-to-understand manner, and the present invention is not necessarily limited to a case including all the described configurations. In addition, a portion of the configuration of one example may be replaced with the configuration of another example. Further, the configuration of one example may be added to the configuration of another example.

Regarding some components in the examples, other components may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file, that realizes each function can be stored in a memory, a storage device such as a hard disk and a solid state drive (SSD), or a recording medium such as an IC card, an SD card, and a DVD.

Control lines and information lines considered necessary for the descriptions are illustrated, and not all the control lines and the information lines in mounting are necessarily shown. In practice, it may be considered that almost all components are connected to each other.

REFERENCE SIGNS LIST

D001 own-vehicle movement recognition sensor
D002 external-field recognition sensor group
D003 positioning system
D004 map unit
D005 input communication network
D006 sensor recognition integration device
D007 autonomous-driving plan determination device
D008 actuator group
D009 information storage unit
D010 sensor object information integration unit
D011 own-vehicle surrounding information integration unit

The invention claimed is:

1. A vehicle control system comprising:
a vehicle;
a movement sensor that is disposed in the vehicle;
an external field sensor that is disposed in the vehicle; and
an integration unit that estimates: i) information on a position and a speed of a target existing in an external field, and ii) errors of the position and the speed of the target, based on information from the movement sensor on the vehicle that acquires movement information including a vehicle speed and a yaw rate of the vehicle, and iii) information from the external field sensor that acquires information on the external field of the vehicle, wherein
the integration unit uses the vehicle speed and the yaw rate acquired by the movement sensor, to predict a position and a speed of the target and to predict errors of the position and the speed of the target at a second time after a first time, from a position and a speed of the target and errors of the position and the speed at the first time; and
an actuator group that operates actuators based on the information on a position and a speed of a target.

2. The vehicle control system according to claim 1, wherein the integration unit predicts the position and the speed of the target and the errors of the position and the speed at the second time in a manner that a relative position of the target at the first time is converted into the relative position of the target at the second time in a state where the relative speed of the target is converted into an absolute speed, and then the absolute speed of the target is converted into a relative speed.

3. The vehicle control system according to claim 2, wherein
the integration unit
converts the speed of the target from a relative speed in a following coordinate system into an absolute speed in a stationary coordinate system,
converts the position of the target at the first time into the position of the target at the second time,
transforms an origin position in a relative coordinate system at the first time into an origin position of a relative coordinate system at the second time, and converts the speed of the target from the absolute speed into the relative speed in the following coordinate system.

4. The vehicle control system according to claim 1, wherein the integration unit predicts the position and the speed, and the errors of the position and the speed at the second time in consideration of an error of the vehicle speed of the vehicle and an error of the yaw rate.

5. The vehicle control system according to claim 1, wherein the error is represented by a covariance matrix according to Gaussian distribution.

6. The vehicle control system according to claim 1, wherein the error is represented by distribution estimated using a particle filter.

7. A vehicle control method performed by a vehicle control system including an integration unit that estimates information on a position and a speed of a target existing in an external field, and estimates errors of the position and the speed of the target, based on information from a movement sensor on a vehicle that acquires movement information including a vehicle speed and a yaw rate of an own vehicle, and information from an external field sensor that acquires information on the external field of the vehicle, the vehicle control method comprising:
providing a vehicle control system that includes a vehicle, a movement sensor that is disposed in the vehicle, an external field sensor that is disposed in the vehicle, and an integration unit that estimates information on a position and a speed of a target existing in an external field, and estimates errors of the position and the speed of the target, based on information from the movement sensor on the vehicle that acquires movement information including a vehicle speed and a yaw rate of an own vehicle, and information from the external field sensor that acquires information on the external field of the vehicle;
by the integration unit, using the vehicle speed and the yaw rate acquired by the movement sensor, to predict a position and a speed of the target and predict errors of the position and the speed of the target at a second time after a first time, from a position and a speed of the target and errors of the position and the speed at the first time, and
by an actuator group, operating actuators based on the information on a position and a speed of a target.

8. The vehicle control method according to claim 7, further comprising:
by the integration unit, predicting the position and the speed of the target and the errors of the position and the speed at the second time in a manner that a relative position of the target at the first time is converted into the relative position of the target at the second time in a state where the relative speed of the target is converted into an absolute speed, and then the absolute speed of the target is converted into a relative speed.

9. The vehicle control method according to claim 8, further comprising:
by the integration unit, converting the speed of the target from a relative speed in a following coordinate system into an absolute speed in a stationary coordinate system;
by the integration unit, converting the position of the target at the first time into the position of the target at the second time;

by the integration unit, transforming an origin position in a relative coordinate system at the first time into an origin position of a relative coordinate system at the second time; and by the integration unit, converting the speed of the target from the absolute speed into the relative speed in the following coordinate system.

10. The vehicle control method according to claim 7, further comprising:

by the integration unit, predicting the position and the speed, and the errors of the position and the speed at the second time in consideration of an error of the vehicle speed of the vehicle and an error of the yaw rate.

11. The vehicle control method according to claim 7, wherein the error is represented by a covariance matrix according to Gaussian distribution.

12. The vehicle control method according to claim 7, wherein the error is represented by distribution estimated using a particle filter.

* * * * *